United States Patent

Lanahan et al.

[15] 3,704,781

[45] Dec. 5, 1972

[54] INFORMATION STORAGE CARDS

[72] Inventors: John H. Lanahan, Whitesboro; William W. Abraham, Utica, both of N.Y.

[73] Assignee: Mohawk Industrial Laboratories, Inc., Vernon, N.Y.

[22] Filed: Aug. 11, 1970

[21] Appl. No.: 62,901

[52] U.S. Cl...........................209/80.5, 235/61.12 R

[51] Int. Cl.................................................B07c 5/34

[58] Field of Search.....235/61.12 R; 209/80.5, 110.5

[56] References Cited

UNITED STATES PATENTS

| | | | |
|---|---|---|---|
| 2,848,163 | 8/1958 | Serrell | 235/61.12 R |
| 2,289,380 | 7/1942 | Nevin | 235/61.12 R |
| 3,478,877 | 11/1969 | Parry | 235/61.12 R |
| 2,531,786 | 11/1950 | Rembold | 235/61.12 R |
| 2,546,012 | 3/1951 | Owen | 235/61.12 R |
| 2,483,035 | 9/1949 | Burns | 235/61.12 R |

*Primary Examiner*—Allen N. Knowles

*Attorney*—Larson, Taylor & Hinds

[57] ABSTRACT

Information storage cards are provided with notches on an edge thereof at a location corresponding to information on the card. The notches are utilized for the selection of certain cards from a plurality of edge-aligned cards. According to the present invention, the notches have a novel configuration which facilitates separation of the desired cards. In a first embodiment, each notch is defined by a first side extending from a point at the card edge inwards at an angle of more than 90°, preferably 120° to 150°, with respect to the horizontal and by a second side extending from a point spaced from said first point on the card edge inwards at an angle of not more than 90° with respect to the card edge, both angles being taken in a sense through the card material and not through the notch opening. In another embodiment, both sides of the notch extend inwards at an angle of less than 90° taken in a sense through the card material.

15 Claims, 7 Drawing Figures

INVENTORS
JOHN H. LANAHAN
WILLIAM W. ABRAHAM

Larson, Taylor and Hinds
ATTORNEYS

INFORMATION STORAGE CARDS

BACKGROUND OF THE INVENTION

This invention relates to information storage cards for card sorting devices and methods. More particularly, the invention relates to such cards which are provided with notches in an edge thereof, the number and/or location of said notches along the edge being related to information on the card. Still more particularly, the invention relates to the configuration of notches provided in such cards.

The use of notches in edges of data storage cards for purposes of selecting certain cards from a plurality of edgealigned cards is known. A system of this type is disclosed in co-pending U.S. Patent application Ser. No. 811,826, now U.S. Pat. No. 3,586,166 which is herein incorporated by reference. A plurality of data storage cards are held in vertical orientation with edges in alignment in the card storage area of the device. Each card is provided with one or more notches in the lower edge thereof the number and/or location of the notches corresponds to the information on the card. Details of a particular encoding scheme are given in co-pending application Ser. No. 867,441, now U.S. Pat. No. 3,645,438, herein incorporated by reference. The card sorting device includes a plurality of elongate code bars located below the cards and extending across the card storage area in a direction transverse to the cards. Each code bar is individually and selectively movable relative to the remaining code bars from a first position spaced downwardly from the lower edges of the cards to a second position in adjacency with the lower edges of the cards and extending transverse to the cards. In the second position, each code bar is in registration with a notch area along the lower edge of the card, such area being notched or not for any given card depending on the information carried by the card.

In order to select the cards having desired information indicated by the number and/or position of notches in the lower edge of the cards, certain selected code bars are moved into the second position in registration with the appropriate notch areas. Selected cards, i.e., those cards having notches in registration with all of the selected code bars, are then moved downwardly relative to unnotched the remaining cards which are restrained from downward motion by the selected code bars, since the remaining cards have at least one unntoched notch area in registration with a selected code bar. After the thus-selected cards are moved downwardly, the remaining cards are moved as a group relative to the selected cards to effect further separation. In a preferred system, the rejected cards are moved in a direction transverse to the code bars.

While the device described provides effective card separation, there are certain disadvantages which may result when the number of notch areas is increased to enlarge the code capacity of the device. First, by providing a plurality of closely spaced notch areas to enlarge code capacity, it is quite likely that a notch area (which may contain a notch) in one of the remaining, hereinafter called "rejected," cards will traverse a selected code bar when the rejected cards are moved as a group relative to the code bars. It will be recalled that the rejected cards move laterally as a group transverse to the code bars in close adjacency therewith. It is therefore possible, particularly if the card is tipped slightly relative to a plane defined by the upper surfaces of the selected code bar, for a notch in a rejected card to catch on a selected code bar thus interferring with the lateral motion of the rejected cards.

Another difficulty which arises is in registering the code bars with notches. To maximize capacity, both the code bars and the notches should be as thin as possible and as closely spaced as possible. The minimum thickness of the code bar is a practical matter depending on the ability to position each code bar in the device such that each notch in each card in the storage area will be in registry with the proper code bar. This, in turn, depends on the length of the code bar, the number and type of guides for the code bars, and so forth. Once a minimum thickness is reached, it will be apparent that the notch width must be somewhat wider. The notch width should exceed code bar thickness by a minimum value to provide maximum code capacity. However, as notch width approaches code bar thickness, the likelihood of interference with downward motion of selected cards increases. For example, if the frictional contact between notch edges in selected cards and the selected code bars is excessive, selected cards may not move downwardly sufficiently, resulting in treatment of such card as a rejected card.

It is an object of the present invention to provide a data storage card for card sorting devices and methods of the type described which are free from one or more of the disadvantages mentioned above.

BRIEF SUMMARY OF THE INVENTION

The foregoing and other objects which will be apparent to those having ordinary skill in the art are achieved according to the present invention by providing an information storage card having notches in at least one edge thereof for selection of the card from a plurality of such cards, each of the notches being defined by a first side extending from a first point at the card edge inwards at a first angle of not more than 90° with respect to the card edge, and by a second side extending from a second point at the card edge inwards at a second angle of more than 90° with respect to the card edge, said angles being taken in a sense through the card material and not through the notch opening. In another embodiment of the invention, the objects of the invention are achieved by providing an information storage card wherein said second side terminates at a point inwards of the card edge whereby the notch sides present point contact with a code bar insertable into said notch.

DESCRIPTION OF THE PREFERRED EMBODIMENT

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
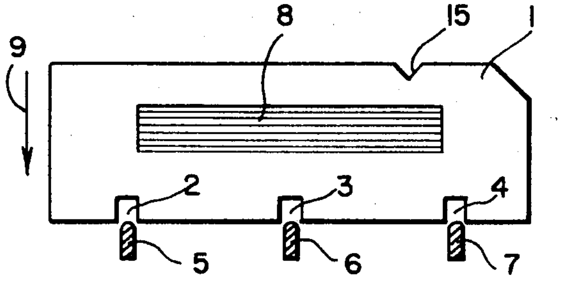
FIGS. 1 and 2 are diagrammatic side elevations of conventional information storage cards, FIG. 1 showing a selected card and FIG. 2 showing a rejected card.
Figure 2:
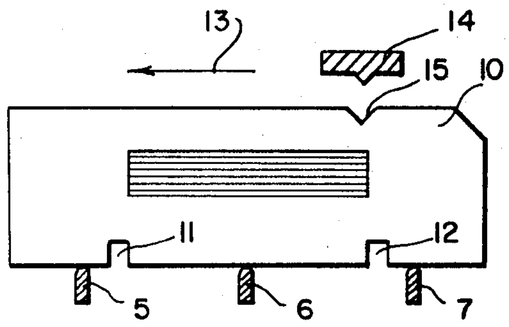

With reference to FIG. 1, there is illustrated a selected information storage card 1 having notches 2, 3, and 4 in registry with, respectively, selected code bars 5, 6 and 7. The card is of a conventional type, approximately 7 mills in thickness, and bearing information 8 in any form such as printed, magnetic, and the like. The selected card illustrated is one of a plurality of cards located in the storage area of a card sorting device more fully described in co-pending application Ser. No. 811,826. The selected cards which have notches in the lower edge thereof corresponding to all of the selected code bars, are moved downwardly relative to the remaining cards. Thus, selected card 1 moves downwardly in the direction of arrow 9 from the position shown in FIG. 1 until the card is restrained from further downward motion by engagement of code bars 5, 6 and 7 in notches 2, 3 and 4. Rejected cards, which do not have notches in registry with all of the selected code bars, are restrained from downward motion by the code bars as illustrated in FIG. 2. Card 10 includes notches 11 and 12 which are not in registration with the selected code bars. Thus the code bars prevent downward motion of card 10 in the direction of arrow 9. Card 10 is thus a "rejected" card. After all of the selected cards are moved downwardly in direction of arrow 9, the remaining rejected cards are moved in the direction of arrow 13 to effect separation of the selected and rejected cards. This is conventionally accomplished by engaging a member 14 with a notch 15 provided in the upper edge of all of the cards. Member 14 is movable downwardly to engage all of the notches and is then movable rearwardly in the direction of arrow 13 to move all of the rejected cards in that direction.

As explained above, the movement of the cards in the foregoing manner may be interfered with when the code capacity of the cards is enlarged. Thus, in FIG. 1, code bars 5, 6 or 7 may frictionally engage notches 2, 3 or 4 thus interferring with effective downward motion of the selected cards. Similarly, in FIG. 2, as card 10 is moved in the direction of arrow 13, it is possible that a notch such as notch 11, will catch on the top of code bar 5 thus inhibiting motion of the rejected cards in the direction of arrow 13. These advantages associated with information storage cards utilized heretofore are overcome by utilizing such cards having notches in accordance with the present invention as illustrated in FIGS. 3 – 7.

Figure 3:
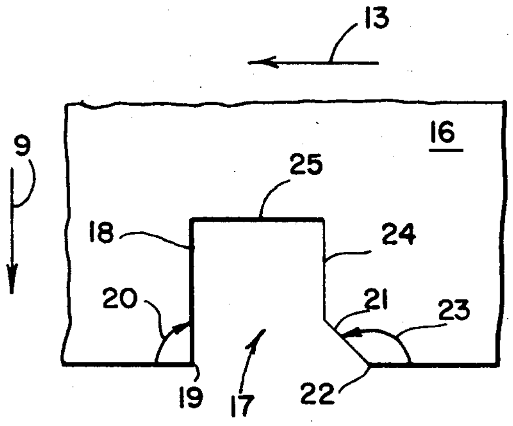
FIG. 3 shows a portion of an information storage card having a notch according to the present invention.

A portion of a card 16 as shown in FIG. 3 having a notch 17 according to the present invention. Notch 17 is defined by a first side 18 extending from a first point 19 at the card edge inwards at a first angle 20 not more than 90° with respect to the card edge and by a second side 21 extending from a second point 22 at the card edge inwards at an angle 23 greater than 90° with respect to the card edge, both of said angles being taken in a sense through the card material as shown and not through the notch opening. The notch is further defined by side portions 24 and 25 joining the first and second side portions 18 and 21. By providing a notch having tapered side portion 21 as shown in FIG. 3, card separation is facilitated. In the first place, tapered portion 21 permits easier ingress of a code bar into the notch. Thus, if card 16 is a selected card, the card more readily moves downwardly in the direction of arrow 9 towards selected code bars. If, on the other hand, card 16 is a rejected card, tapered side portion 21 acts as a cam surface which minimizes engagement of the rejected card with a selected code bar upon moving the rejected cards laterally of the code bars as indicated by arrow 13. Angle 23 is preferably from 120° to 150° to provide effective cam action. As shown, angle 23 is approximately 135°. Angle 20 may be 90° as shown in FIG. 16 but is preferably less than 90° as shown, for example, in FIG. 4.

Figure 4:
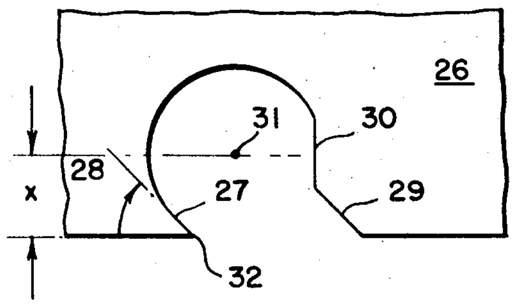

Card 26 shown in FIG. 4 is provided with notches defied by a first side wall 27 extending inwards of the card at an angle 28 less then 90° and a second side 29 similar to side 21 of FIG. 3. A further side portion 30 joins side portions 27 and 29. Side 27 is circular having a center at 31 which is located inwards of the card a distance x less than the circle radius. Side 27 thus terminates in a point 32 which presents a minimum amount of contact between side wall 27 and a code bar. Thus, if card 26 is a selected card and moves downwardly relative to a code bar in registry with the notch therein, there is a minimum amount of frictional engagement between side wall 27 and the code bar thus reducing the likelihood that card 26 will not move downwardly properly into engagement with the selected code bars. Side 29, as in the case of side 21 shown in FIG. 3, functions as a cam surface for lateral movement of rejected cards relative to raised code bars. It will be apparent from FIG. 4 that the sides of the notch may be curvilinear or straight. Where the side is curvilinear, its angle of inclination with respect to the card edge is taken as the angle of the tangent of the line defining the side.

Figure 5:
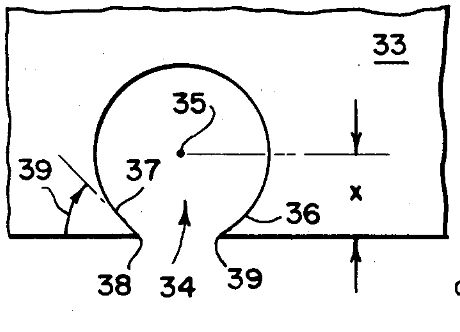

In an alternative embodiment, as shown in FIG. 5, both of the sides of the notch extend at angles of less than 90° with respect to the card edge taken in a sense through the material as shown in FIG. 5. Card 33 includes notch 34 which is defined by a circle centered at 35 at a point inwardly of the card edge a distance *x* which is less than the circle radius. Side 37 extends inwardly of the card from a point 38 at an angle 39 less than 90° taken in a sense through the card material. Similarly, side 36 extends inwardly from point 39 at an identical angle. If card 33 is selected, it will therefore present a minimum area of contact with a selected code bar. Thus, in the embodiment of FIG. 5, the likelihood of excess frictional engagement between the sides of the notch and a selected code bar is minimized.

Figure 6:
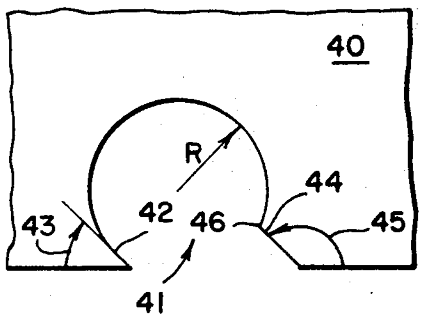
FIGS. 4 – 7 show portions of information storage cards having alternative notches according to the present invention.

The minimum frictional engagement achieved in the notch of FIG. 5 is also achieved in a card having a notch as shown in FIG. 6 and, in addition, this notch provides a cam action such as achieved with the notches of FIGS. 3 and 4. card 40 includes a notch 41 which is defined by a first side wall 42 extending at an angle 43 less than 90° and a second side wall 44 extending at an angle 45 of greater than 90° to provide cam action. However, side 44 terminates at a point 46 inwards of the card edge. Thus, contact between the notch sides and a code bar is limited to point contact as in the case of FIG. 5.

Figure 7:
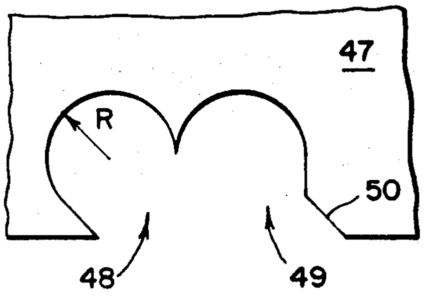

As shown in FIG. 7, notches according to the invention can be overlapped. For example, a card 47 may include two adjacent notches 48 and 49 defined respectively by circles having centers located at points inward of the card edge a distance less than the radius of the circle. The circle centers are separated by a distance less than the circle diameter thus resulting in overlap as shown. As in other notches provided according to the invention, the overlapped notches may include a side portion extending at an angle of greater than 90° taken in a sense through the card material to provide a tapered side 50 which provides a cam action for rejected cards as explained above.

It will be readily apparent that, when a card is provided with notches having a cam side as described above, the cam side of each notch will be disposed in the same direction in a manner to facilitate motion of rejected cards laterally with respect to the elevated code bars. In a preferred embodiment, rejected cards are moved rearwardly in the card storage area. Accordingly, the tapered cam sides provided according to the present invention will extend from a point on the lower edge of a card upwardly and rearwardly of the card. On the other hand, if rejected cards are to be moved forwardly in the device, the tapered sides would, of course, be oriented in the opposite manner.

What is claimed is:

1. An information storage card having notches in the bottom edge thereof for selection of the card from a plurality of such cards, the position of the notches along said bottom edge corresponding to information stored on said card, the size and shape of each of the notches being the same, each of the notches being defined by a first side extending from a first point at the card edge inwards at a first angle of not more than 90° with respect to the card edge, and by a second side extending from a second point at the card edge inwards at a second angle of more than 90° with respect to the card edge, said angles being taken in a sense through the card material and not through the notch opening.

2. An information storage card according to claim 1 wherein said first angle is about 90° and said second angle is from about 120° to 150°.

3. An information storage card according to claim 1 wherein said second side is straight and said second angle is between 120° to 150°.

4. An information card according to claim 1 wherein said first side is circular, the center of said circle being located within said notch.

5. An information storage card according to claim 1 wherein said second side terminates at a point inwards of the card edge whereby the notch sides present point contact with a code bar insertable into said notch.

6. An information storage card according to claim 1 wherein adjacent notches overlap.

7. An information storage card having notches on at least one edge thereof for selection of the card from a plurality of such cards, each of the notches being defined by first and second notch sides extending from first and second points at the card edge inward at first and second angles of less than 90° with respect to said adjacent card edge, said angles being taken in a sense through the card material and not through said notch.

8. An information storage card according to claim 7 wherein said notch is defined by a circular aperture, the center of said circle being located above the bottom edge of the card a distance less than the circle radius.

9. An information storage card according to claim 8 wherein adjacent circular notches overlaps.

10. In a method of separating certain selected cards from a plurality of edge aligned, vertically oriented cards having notches in a lower edge thereof wherein selected cards are moved downwardly relative to at least one elongate code bar extending transversely of the cards adjacent a lower edge thereof in registry with the notches in said selected cards, and wherein the remaining cards are restrained from moving downwardly by said code bars, the improvement wherein each of said cards comprises an information storage card having notches in at least one edge thereof for selection of the card from a plurality of such cards, each of the notches being defined by a first side extending from a first point at the card edge inwards at a first angle of not more than 90° with respect to the card edge, and by a second side extending from a second point at the card edge inwards at a second angle of more than 90° with respect to the card edge, said angles being taken in a sense through the card material and not through the notch opening.

11. An information storage card according to claim 7 wherein said second side terminates at a point inwards of the card edge whereby the notch sides present point contact with a code bar insertable into said notch.

12. An information storage card according to claim 11 wherein adjacent circular notches overlap.

13. In a method of separating certain selected cards from a plurality of edge aligned, vertically oriented cards having notches in a lower edge thereof wherein selected cards are moved downwardly relative to at least one elongate code bar extending tranversely of the cards adjacent a lower edge thereof in registry with the notches in said selected cards, and wherein the remaining cards are restrained from moving downwardly by said code bars, the improvement wherein said cards comprise cards having notches in the bottom edge thereof for selection of the card from a plurality of such cards, the position of the notches along said bottom edge corresponding to information stored on said card, the size and shape of each of the notches being the same, each of the notches being defined by a first side extending from a first point at the card edge inwards at a first angle of not more than 90° with respect to the card edge, and by a second side extending from a second point at the card edge inwards at a second angle of more than 90° with respect to the card edge, said angles being taken in a sense through the card material and not through the notch opening.

14. An information storage card having circular notches in the bottom edge thereof for selection of the card from a plurality of such cards, each of the notches being defined by a circular aperture, the center of said circle being located above the bottom edge of the card a distance less than the circle radius such that a first side of the aperture extends from a first point at the card edge inwards at a first angle less than 90° with respect to the bottom card edge, each notch being further defined by a second side extending inwards at a second angle of more than 90°with respect to the bottom card edge, the second side intersecting said circular notch at a point inwards of the card edge, said angles being taken in a sense through the card material and not through the notch opening.

15. An information storage card according to claim 14 wherein adjacent circular notches overlap.

* * * * *